UNITED STATES PATENT OFFICE

1,976,293

PROCESS FOR THE SEPARATION OF HAFNIUM AND ZIRCONIUM

Wilhelm Prandtl, Munich, Germany

No Drawing. Application May 20, 1932, Serial No. 612,649. In Germany June 6, 1931

1 Claim. (Cl. 23—22)

The known processes for the separation of hafnium and zirconium are open to the objection that they are very inefficient and must therefore be repeated many times before the pure products are obtained, and moreover that they mostly require the employment of concentrated strong acids or of hydrofluoric acid as solvents.

It has been found that hafnium and zirconium can be satisfactorily separated in acid, neutral or alkaline solutions if the solutions of the salts of these two elements are fractionally precipitated with ferrocyanide ion. Hafnium ferrocyanide is much more difficult to dissolve than zirconium ferrocyanide; the hafnium is therefore almost completely concentrated in the first ferrocyanide precipitation. It is advisable to carry out the precipitation in the presence of substances, which form complex combinations with hafnium and zirconium, i. e. for instance oxalic, tartaric, citric and similar organic acids. As the ferrocyanide precipitation enables a rapid concentration of the hafnium, it is possible to employ at the outset for the production of high percentage hafnium preparations initial materials poor in hafnium but cheap, such as zirconium sand.

The separation of hafnium and zirconium by means of ferrocyanides can take place in the presence of various acids, both mineral and organic and also acids from solutions of widely different hydrogen ion concentrations.

In order to show the efficacy of the ferrocyanide precipitation for the separation of hafnium and zirconium, the following results of experiments may be mentioned.

From the sulphate solution containing the equivalent of 1 kg. of zirconium oxide from zirconium sand with about 1% of hafnium oxide and to which has been added 40 grs. (Zr,Hf)$O_2$ (zirconium-hafnium-oxide) with about 15% $HfO_2$ were obtained by one precipitation with 500 grs. sodium ferrocyanide, that is about 60% of the existing hafnium, were concentrated in a small quantity of oxide mixture. 400 grs. zirconium-hafnium-oxide with about 20% $HfO_2$ were decomposed by ferrocyanide precipitation, from sulphate solution containing oxalic acid, in three fractional processes the first ferrocyanide precipitation yielded an oxide with about 50% $HfO_2$ (density 7.63), the second fraction an oxide with about 5% $HfO_2$ (density 5.94) and an oxide with only about 0.4% $HfO_2$ (density 5.74) remained in solution. The first fraction with about 50% $HfO_2$, after treatment with relatively concentrated sodium lye, for the purpose of converting the ferrocyanides into the hydroxides separation of the liquid constituent, digestion of the precipitate, consisting chiefly of the hydroxides hafnium and zirconium, with diluted sulphuric acid and oxalate and, after renewed precipitation of the solution thus obtained with sodium ferrocyanide, yielded 42 grs. of an oxide with about 70% $HfO_2$, and this latter was decomposed by a fresh ferrocyanide precipitation into 27 grs. oxide with 85% $HfO_2$ (density 9.0) and 15 grs. oxide with about 15% $HfO_2$ (density 6.3).

I claim:

A process of separating hafnium and zirconium, consisting in adding a soluble ferrocyanide to a solution of hafnium and zirconium salts to form a precipitate of hafnium and zirconium ferrocyanides, in which the ratio of hafnium to zirconium exceeds that of the solution, separating the hafnium-zirconium ferrocyanides from the solution, treating the hafnium-zirconium ferrocyanides with alkaline hydroxides for the purpose of converting the ferrocyanides into hydroxides, separating the insoluble portion from the solution and dissolving in acid said insoluble portion, comprising the hydroxides of hafnium and zirconium, and again adding a soluble ferrocyanide to said formed solution of hafnium and zirconium salts to form a second precipitate of hafnium and zirconium ferrocyanides from said solution, and continuing the process until the necessary concentration of hafnium oxide is contained in the ferrocyanide precipitate.

WILHELM PRANDTL.